G. MACLOSKIE.
ELECTROPNEUMATIC AIR BRAKE SYSTEM.
APPLICATION FILED FEB. 1, 1910.
960,361.
Patented June 7, 1910.
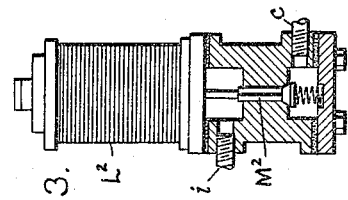
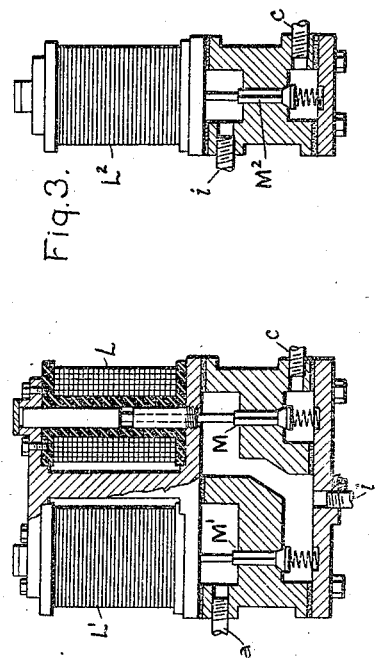
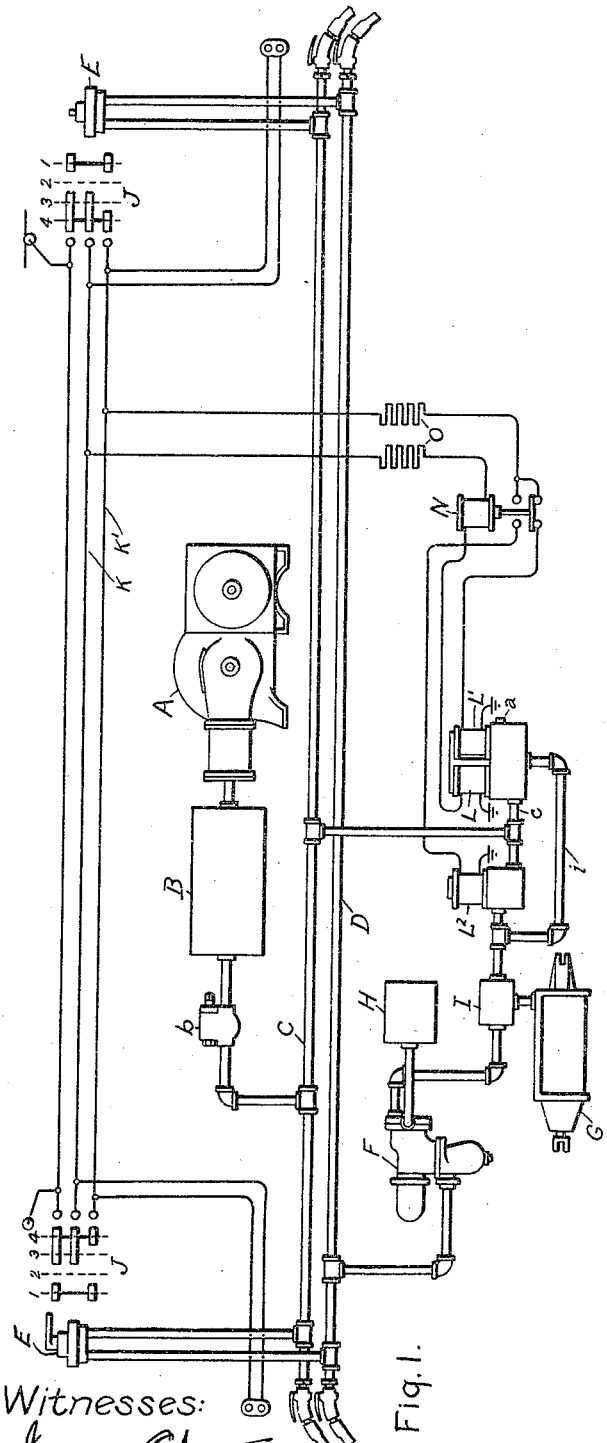
Witnesses:
Irving E. Steers
J. Ellis Elen
Inventor
George Macloskie,
by Albert H. Davis
His Attorney.

UNITED STATES PATENT OFFICE.

GEORGE MACLOSKIE, OF SCHENECTADY, NEW YORK, ASSIGNOR TO GENERAL ELECTRIC COMPANY, OF NEW YORK, N. Y.

ELECTROPNEUMATIC AIR-BRAKE SYSTEM.

960,361.　　　　Specification of Letters Patent.　　Patented June 7, 1910.

Application filed February 1, 1910. Serial No. 541,363.

*To all whom it may concern:*

Be it known that I, GEORGE MACLOSKIE, a citizen of the United States, residing at Schenectady, county of Schenectady, State of New York, have invented certain new and useful Improvements in Electropneumatic Air-Brake Systems, of which the following is a specification.

My invention relates to electro-pneumatic air brake systems in which the admission of air to and release of air from the brake cylinder is controlled electrically, and its object is to provide a simple arrangement for supplying air rapidly to the cylinder for emergency applications of the brake.

My invention in one aspect consists in providing two independent electrically operated valves for admitting air to the brake cylinder, with means for energizing the magnet of one valve only for service applications and both magnets for emergency applications. By means of this arrangement air is admitted through two valves simultaneously, instead of through one only, in emergency applications, and the brakes are, consequently, applied much more quickly.

In another aspect my invention relates to the control of the several valve operating magnets in a simple manner with only two control wires. In this aspect my invention consists in the combination with the brake cylinder and a source of pressure therefor, of a pair of control wires, electromagnetically operated valve mechanism for admitting air to and releasing air from the brake cylinder when current is supplied to the control wires alternately, and means independent of said valve mechanism operative when current is supplied to both wires simultaneously for admitting air to the brake cylinder for emergency applications.

My invention will best be understood by reference to the accompanying drawings, in which—

Figure 1 shows diagrammatically an air brake system arranged in accordance with my invention; Fig. 2 shows a view, partly in cross-section, of the electro-magnetic valve mechanism for service applications and for release, and Fig. 3 shows a view, partly in cross-section, of the electro-magnetic valve for emergency applications.

In Fig. 1, I have shown my invention as applied to a combined pneumatic and electric brake system, the pneumatic system comprising the usual elements of an automatic air brake system, that is, train pipe, triple valve, and auxiliary reservoir, and the electro-pneumatic system comprising valve mechanism and magnets for operating them, one or the other of the two systems being connected to brake cylinder by a double throw check valve, according as one system or the other is being used to operate the brakes. A system of this type is shown in my prior Patent No. 869,444, dated October 29, 1907.

In the drawings, A represents an air compressor and B a main reservoir connected through a pressure reducing valve or feed valve $b$ to a train pipe C to which the motorman's valves are connected on one side. These valves, on the other side, are connected to the train pipe D to which the triple valves are connected.

E E are the motorman's valves for controlling the pressure in the train pipe D, F a triple valve, G a brake cylinder and H an auxiliary reservoir.

I represents a double throw check valve, which acts, as in my former patent, to connect the brake cylinder to the triple valve F or to the electro-magnetic valves.

The arrangement of the electro-pneumatic system, to which my present invention relates, comprises switch contacts J J under the control of the motorman, control wires K, K' and magnets L, L' and L² and the valves controlled thereby. These magnets are, respectively, the service application magnet, the release magnet and the emergency application magnet.

N represents a relay controlling the emergency application magnet and O represents resistances.

Each of the switches J has four positions indicated by dotted lines 1 to 4. When the contact fingers engage the contacts on dotted line 1, the connections for releasing the brakes are established. In this position of the switch, current is supplied to control wire K', so that release magnet L', which is normally connected to this control wire, is energized. Each of the magnets L, L' and L² when energized opens a puppet valve M, M' or M², which is normally held seated by a light spring. Thus, when magnet L' is energized, its plunger is drawn down unseating the valve M' and connecting the pipe $i$ to pipe $a$. Pipe $a$ opens to the atmosphere, while pipe *i* leads through the double throw check valve I to break cylinder. Thus, when magnet L' is energized the connections are established, as has been stated, for releasing the brakes. When the contact fingers of switch J are on dotted line 2, all of the magnets are deënergized and all the puppet valves are closed, this corresponding to lap position. For service applications, the switch J is moved to position 3 in which control wire K is energized. To this wire are connected the relay N and service application magnet L. Although relay N is energized and draws up its contacts this has no effect, since it merely connects the emergency magnet $L^2$ to control wire K' to which no current is being supplied in this position of switch J. The magnet L, however, being energized opens its valve M admitting air from the control pipe through pipe connection *c* to pipe *i*, and thence through the double throw check valve I to brake cylinder. To hold the brakes applied switch J is returned to position 2 and to release the brakes the switch is returned to position 1.

For an emergency application, switch J is moved to position 4. In this position both control wires K and K' have current supplied to them. Relay N and service application magnet L are accordingly energized as in service applications, but moreover emergency magnet $L^2$ is now also energized, since it is connected through the contact of relay N to control wire K', to which current is being supplied through the switch J. Thus, not only the service magnet L, but the emergency magnet $L^2$ is also energized, opening the valve $M^2$ and thereby establishing a connection from the control pipe through pipe *c* to pipe *i*, and thence to the brake cylinder. Air is thus fed to the brake cylinder through both valves M and $M^2$, so that a more rapid application of the brakes is obtained than in service application. The release magnet L', although normally connected to control wire K', has its connection broken by relay N when switch J is in the emergency position, and thus it is prevented from being energized.

I do not desire to limit myself to the particular construction and arrangement of parts shown and described, but aim in the appended claims to cover all modifications which are within the scope of my invention.

What I claim as new and desire to secure by Letters Patent of the United States, is,—

1. In an air brake system, in combination with the brake cylinder and source of pressure therefor, two independent valves for admitting air from said source to said cylinder, two independent electro-magnets for operating said valves respectively, and means for energizing one only of said magnets for service applications and both of said magnets for emergency applications.

2. In an air brake system, in combination with the brake cylinder and source of pressure therefor, three independent valves, one for releasing air from the brake cylinder and the other two for independently admitting air from said source to the brake cylinder, three independent electro-magnets for operating said valves respectively, and means for energizing one only of the magnets operating the admission valves for service application and both of said magnets for emergency application.

3. In an air brake system, in combination with the brake cylinder and source of pressure therefor, a pair of control wires, electro-magnetically operated valve mechanism for admitting air to, and releasing air from, the brake cylinder when current is supplied to said wires alternately, and means independent of said valve mechanism, operative when current is supplied to both wires simultaneously, for admitting air to the brake cylinder for emergency applications.

4. In an air brake system, in combination with the brake cylinder and source of pressure therefor, a pair of control wires, electro-magnetically operated valve mechanism for admitting air to, and releasing air from, the brake cylinder when current is supplied to said wires alternately, a valve independent of said valve mechanism for admitting air to brake cylinder for emergency applications, a normally deënergized electro-magnet for operating said valve, and means for energizing said magnet when current is supplied to both of said wires simultaneously.

5. In an air brake system, in combination with the brake cylinder and source of pressure therefor, a pair of control wires, electro-magnetically operated valve mechanism for admitting air to, and releasing air from, the brake cylinder when current is supplied to said wires alternately, a valve independent of said valve mechanism for admitting air to brake cylinder for emergency application, a normally deënergized electro-magnet for operating said valve, and a relay for connecting said magnet to one of said control wires when current is supplied to both wires simultaneously.

6. In an air brake system, in combination with the brake cylinder and source of current therefor, electro-magnetic valve mechanism for controlling the brake cylinder pressure comprising a release magnet, a service application magnet, and an emergency application magnet, two control wires to which the first two magnets are normally connected, the third magnet being normally disconnected from both wires, and a relay connected to the same control wire as the service application magnet having contacts for disconnecting the release magnet from the other control wire and connecting the emergency magnet thereto.

7. In an air brake system, in combination with the brake cylinder and source of current therefor, electro-magnetic valve mechanism for controlling the brake cylinder pressure comprising a release magnet, a service application magnet, and an emergency application magnet, two control wires to which the first two magnets are normally connected, the third magnet being normally disconnected from both wires, and means operative when current is supplied to both control wires simultaneously for energizing the emergency application magnet and preventing the energization of the release magnet.

In witness whereof, I have hereunto set my hand this 31st day of January, 1910.

GEORGE MACLOSKIE.

Witnesses:
    BENJAMIN B. HULL,
    HELEN ORFORD.